United States Patent [19]

Pocock et al.

[11] 3,829,665

[45] Aug. 13, 1974

[54] BINARY RATE MULTIPLIER

[75] Inventors: Adrian R. A. Pocock, Warren, Mich.; Michael A. Cole, Hartford, Conn.

[73] Assignee: Chandler Evans, Inc., West Hartford, Conn.

[22] Filed: Feb. 23, 1973

[21] Appl. No.: 334,979

[52] U.S. Cl. .......................... 235/150.3, 235/92 FQ

[51] Int. Cl. .......................... G06f 15/20, G06f 7/38

[58] Field of Search ........... 235/150.3, 152, 92 FQ; 324/78

[56] References Cited

UNITED STATES PATENTS

| | | | |
|---|---|---|---|
| 2,913,179 | 11/1959 | Gordon | 235/150.3 |
| 2,951,202 | 8/1960 | Gordan | 235/150.3 |
| 2,951,986 | 9/1960 | Gordon | 235/150.3 |
| 3,126,476 | 3/1964 | Pariser et al. | 235/150.3 |
| 3,184,663 | 5/1965 | Mergler | 235/150.3 |
| 3,230,353 | 1/1966 | Greene et al. | 235/150.3 |
| 3,474,236 | 10/1969 | Batte | 235/150.3 |

*Primary Examiner*—Charles E. Atkinson
*Assistant Examiner*—Errol A. Krass

[57] ABSTRACT

Continuous and direct multiplication of a frequency and a binary number is achieved through the use of a frequency divider and a digital multiplexer. The frequency divider provides a plurality of different frequency signals proportional to a frequency modulated input signal, the different frequency signals being applied as the address inputs to the multiplexer, and the binary number is delivered as the data input to the multiplexer which functions as a data selector to synthesize an output signal having a frequency which corresponds to the frequency of one or more of the signals provided by the frequency divider.

1 Claim, 1 Drawing Figure

PATENTED AUG 13 1974 3,829,665
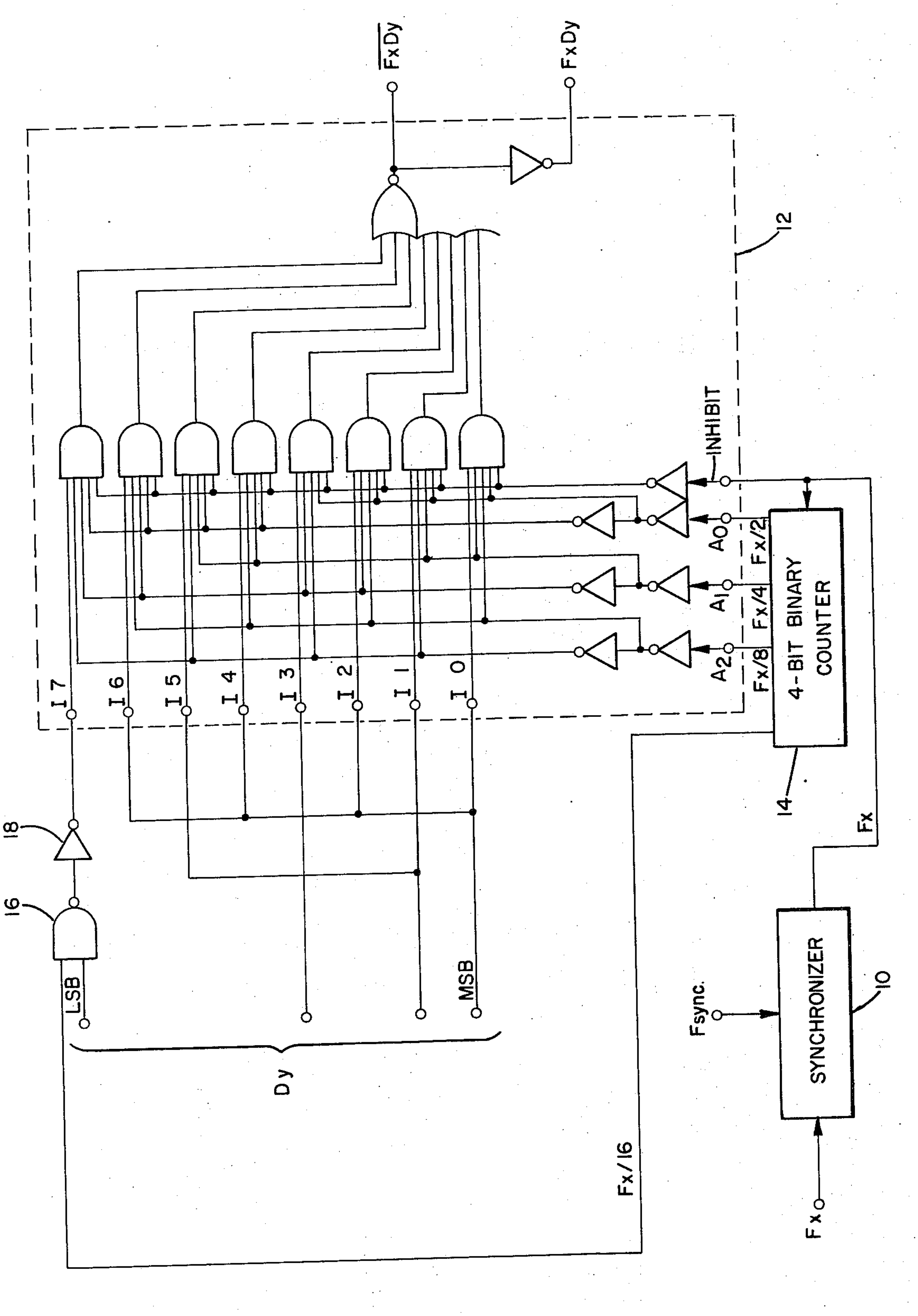

BINARY RATE MULTIPLIER

BACKGROUND OF THE INVENTION

1. Field of the Invention

The present invention relates to a binary rate multiplier. More specifically, this invention is directed to techniques for multiplying a frequency by a binary number. Accordingly, the general objects of the present invention are to provide novel and improved apparatus and methods of such character.

2. Description of the Prior Art

In digital systems, particularly in control systems for use in the positioning of movable actuators, it is often desirable to directly and continuously multiply frequency modulated input data commensurate with a system operating parameter by a binary number commensurate with another system operating parameter. Such direct and continuous digital multiplication of a frequency and a binary number has not previously been accomplished. Rather, in the prior art as exemplified by co-pending Application Ser. No. 164,785 now U.S. Pat. No. 3,739,156, which is assigned to the same assignee as the present invention, it has previously been customary to convert the binary number to a known related frequency and thereafter employ frequency multiplication. Frequency multiplication, however, of necessity requires periodic sampling of the input data and thus cannot be accomplished in continuous fashion.

SUMMARY OF THE INVENTION

The present invention overcomes the above briefly discussed and other disadvantages and deficiencies of the prior art by providing for the digital multiplication of a frequency and a binary number. The present invention thus comprises a binary rate multiplier which receives, as input data, a frequency and a binary number; the input frequency and the binary number being proportional to different data. The variable frequency input signal is applied to a binary counter and to the inhibit input of a digital multiplexer which functions as a data selector. The output of the binary counter and the input binary number are also applied to the data selector respectively as the address and data inputs thereto. The selector generates an output signal at a frequency which is a fraction of the input frequency; the fraction being commensurate with the input binary number.

BRIEF DESCRIPTION OF THE DRAWING

The present invention may be better understood and its numerous objects and advantages will become apparent to those skilled in the art by reference to the accompanying drawing which is an electrical circuit block diagram of a preferred embodiment of the invention.

DESCRIPTION OF THE PREFERRED EMBODIMENT

In accordance with a preferred embodiment of the invention, as shown in the drawing, a frequency $F_x$ proportional to first input data is delivered, via a synchronizer 10, to the inhibit input of an eight channel data selector 12. Synchronizer 10, which is not necessary for all systems, synchronizes the input frequency modulated signal with a known synchronizing frequency, $F_{SYNC}$, as provided by a clock, so that the input to the data selector and a counter 14 comprises pulses having a width equal to one-half the period of $F_{SYNC}$ at the frequency $F_x$. Synchronizer 10, which may comprise a pair of flip-flop circuits and three gates, thus insures that the signal into data selector 12 is in pulse form. The input frequency or $F_x$ signal is also applied to a four bit binary counter 14. Binary counter 14 may comprise a Signetics Type 8281 which, in response to the $F_x$ input, provides output signals commensurate with the frequencies $F_x/2$, $F_x/4$, $F_x/8$ and $F_x/16$.

As will be described in greater detail below, the four different frequency signal outputs of counter 14 are applied as the address inputs to data selector 12. A four bit binary number $D_Y$ proportional to the second piece of input data is delivered as the data input to selector 12.

In one reduction to practice of the invention the data selector 12 comprised a Signetics Type 8231 8-input digital multiplexer. An 8-input digital multiplexer is a circuit, typically provided in integrated circuit form, which comprises the logical equivalent of a single-pole eight position switch whose position is specified by a 3-bit input address. As may be seen from the drawing, since the 8-input digital multiplexer utilized in the disclosed embodiment employed a 3-bit input address, and the address information generated by counter 14 was a 4-bit number, it was necessary to expand the capability of data selector 12. The three bit system is forced to function as a four bit system by gating externally of data selector 12. This external gating is performed by series connected NAND gate 16 and inverter 18.

In operation, a 1 for the most significant bit (MSB) of input $D_Y$ will switch $F_x/2$ to the outputs of data selector 12; the data selector 12 providing, via a NOR gate, a first output $\overline{FxDy}$ which may be inverted to provide a second output FxDy. Similarly, a 1 for the second most significant bit of $D_Y$ switches the address input $F_x/4$ to the outputs of selector 12. If the least significant bit (LSB) only of $D_Y$ is a 1 the frequency passed by selector 12 will be $F_x/16$. Thus, variation of the binary number input $D_Y$ from zero to maximum will vary the output frequency of data selector 12 from zero to $15/16\ F_x$.

As employed herein the term "switch" does not mean the establishment of a direct connection or connections between the outputs of binary counter 14 and an output of data selector 12. Rather, as will be obvious to those skilled in the art, data selector 12 will, by virtue of a NOR output gate, sum a plurality of signals as selected by those of the eight internal AND gates which are enabled by the binary input number $D_Y$. Thus, the data selector 12 will synthesize an output signal having a frequency which is the same as one or a combination of the output signals from counter 14; the thus synthesized signal however usually having a duty cycle which differs from that of the data selector input signal of corresponding frequency. Considering the example given above where an $F_x/2$ output signal appears at the output of selector 12, four pulses having widths equal to the $F_x$ pulse width will be passed by selector 12 during the time it takes counter 14 to count to eight and these four output pulses will all occur during each first one-half cycle of $F_x/8$. Thus, while the output frequency; i.e., the number of selector output pulses per unit of time; will be the product of $D_YF_x$, these output pulses will typically be bunched in groups and thus will have a different duty cycle than the counter output signals of corresponding frequency.

While a preferred embodiment has been shown and described, various modifications and substitutions may be made thereto without departing from the spirit and scope of the invention. Thus, an 8-input data selector has been shown as representative only and it will be understood that, solely by way of example, a 16-bit data selector could be employed merely by cascading two 8-input digital multiplexers. Thus, the present invention has been described by way of illustration and not limitation.

What is claimed is:

1. A binary rate multiplier comprising:

a binary counter with serial entry and parallel output;

means applying a frequency modulated input signal to said binary counter whereby said counter generates a plurality of output signals at different frequencies;

digital multiplexer means, said multiplexer means having an inhibit input and a plurality of address input terminals, said multiplexer means further having a plurality of data input terminals and an output terminal;

first conductor means applying said plurality of said output signals at different frequencies from said binary counter to respective of said multiplexer means address input terminals;

second conductor means for delivering the frequency modulated input signal to the inhibit input of said multiplexer means; and third conductor means applying an input signal in binary form to data input terminals of said multiplexer means whereby the binary input signal will control the synthesis by said multiplexer means of an output signal having a frequency which is the same as one or a combination of said counter generated signals and which multiplexer means output signal may have a duty cycle differing from that of said one or combination of counter generated signals, the synthesized variable frequency output signal being applied to said multiplexer means output terminal.

* * * * *